(12) United States Patent
Ambastha et al.

(10) Patent No.: US 9,405,634 B1
(45) Date of Patent: Aug. 2, 2016

(54) FEDERATED BACK UP OF AVAILABILITY GROUPS

(71) Applicant: EMC Corporation, Hopkinton, MA (US)

(72) Inventors: Nikhil Ambastha, Bangalore (IN); Elango Chockalingam, Bangalore (IN); Vedavathi Ht, Bangalore (IN); Manjesh Venkatanarayana Chikkanayakanahally, Bangalore (IN); Sunil Yadav, Bangalore (IN)

(73) Assignee: EMC CORPORATION, Hopkinton, MA (US)

( * ) Notice: Subject to any disclaimer, the term of this patent is extended or adjusted under 35 U.S.C. 154(b) by 218 days.

(21) Appl. No.: 14/317,203

(22) Filed: Jun. 27, 2014

(51) Int. Cl.
*G06F 17/00* (2006.01)
*G06F 11/14* (2006.01)

(52) U.S. Cl.
CPC ................... *G06F 11/1461* (2013.01)

(58) Field of Classification Search
CPC ................... G06F 17/00; G06F 17/30
USPC .................. 707/600–899
See application file for complete search history.

(56) References Cited

U.S. PATENT DOCUMENTS 9,069,482 B1 * 6/2015 Chopra .................. G06F 3/065

* cited by examiner

*Primary Examiner* — Isaac M Woo
(74) *Attorney, Agent, or Firm* — Dergosits & Noah LLP; Todd A. Noah

(57) ABSTRACT

Federated back up of availability groups is described. A system identifies multiple availability groups scheduled for backup. The system logs in to a structured query language instance on an active node, identifies a primary replica for the first availability group, identifies a backup preference for the first availability group based on the primary replica for the first availability group, and identifies the backup preference for the first availability group as a preferred node for backing up the first availability group if the backup preference for the first availability group is on-line. The system configures backup storage based on a name of a cluster of nodes associated with the availability groups. The system backs up the first availability group based on the preferred node for the first availability group in parallel with backing up the second availability group based on a preferred node identified for the second availability group.

20 Claims, 4 Drawing Sheets

FEDERATED BACK UP OF AVAILABILITY GROUPS

BACKGROUND

If a software error corrupts a data object, or if erroneous data updates the data object, a data protection administrator may restore the data object to a previous uncorrupted state that does not include the corrupted or erroneous data. A backup application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup application to execute a restore operation to restore a copy of the corresponding backup files for that state to the data object.

Some structured query language servers, such as Microsoft's SQL Server 2012, include an "Always On" availability group, which is a high-availability and disaster-recovery solution that provides an enterprise-level alternative to database mirroring. An availability group maximizes the availability of a set of user databases for an enterprise, and supports a failover environment for a discrete set of user databases, known as availability databases, that fail over together from one server, or node, in a cluster to another server, or node, in the cluster. An availability group supports a set of read-write primary replicas of a database and other sets of corresponding secondary replicas of the database. Secondary replicas may be made available for read-only access and/or some backup operations. A system administrator may specify availability group properties, such as backup preference among primary replicas and secondary replicas for running backup jobs, which can thereby improve backup performance. Consequently, when a backup application is scheduled to back up a replica of a database in an availability group, the backup application needs to determine whether the current node in a cluster is the preferred node for backing up the replica. Therefore, as an example, SQL Server 2012 exposes a procedure sys.fn_hadr_backup_is_preferred_replica which takes a database replica name as an input and returns whether a current node is the preferred node to be used for backing up the replica.

DETAILED DESCRIPTION

Figure 1:
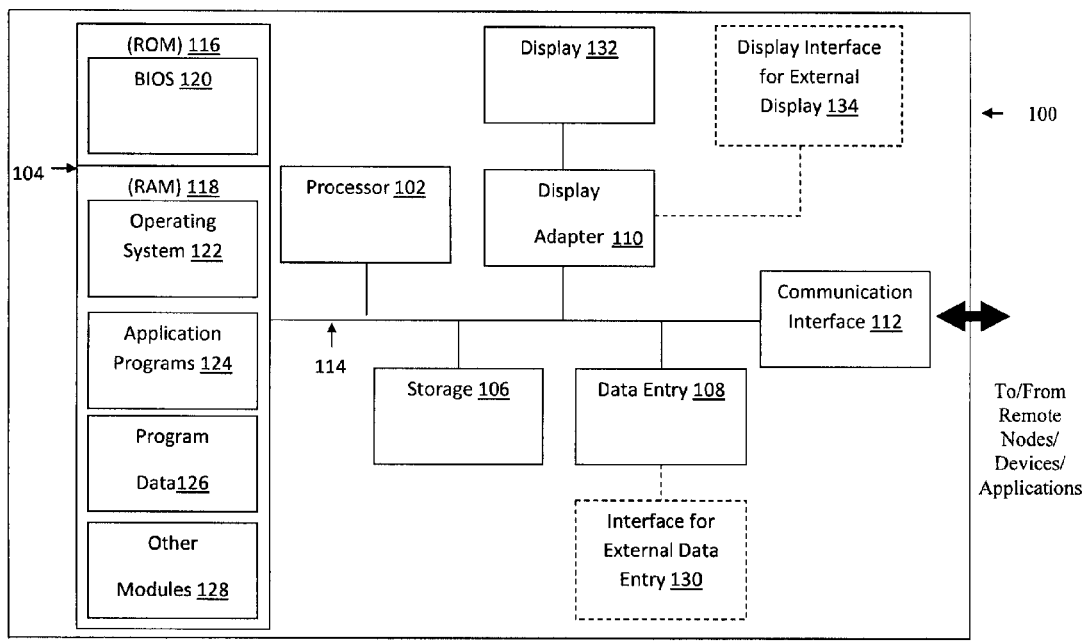
FIG. 1 is a block diagram illustrating an example hardware device in which the subject matter may be implemented.

Some backup applications expect system users to provide multiple save sets for performing backup of a significant number of availability groups. If a system needs to use a procedure which takes a database replica name as an input and returns whether a current node is the preferred node to be used for backing up the database replica, the system must enumerate the database replicas participating in the multiple availability groups, and run the procedure on all of the nodes which are part of the cluster, which would require a significant amount of time. For example, if a backup application is scheduled to create backups of 20 availability groups, each availability group has 20 database replicas, and the cluster has 5 nodes, the system must execute the procedure 2,000 times based on 20 application groups multiplied by 20 database replicas for each application group multiplied by 5 cluster nodes, which does not even include the time required to communicate with all of the nodes. Even after a preferred node is identified for backing up a database replica in an availability group, backing up every database replica in every availability group in a cluster of nodes requires the same process to be executed sequentially on an individual basis for each database replica in each availability group.

Embodiments herein provide federated back up of availability groups. Multiple availability groups scheduled for backup are identified. A structured query language instance on an active node is logged into. A primary replica is identified for an availability group. A backup preference is identified for the availability group based on the primary replica for the availability group. The backup preference is identified for the availability group as a preferred node for backing up the availability group if the backup preference for the availability group is on-line. Backup storage is configured based on a name of a cluster of nodes associated with the multiple availability groups. The first availability group is backed up based on the preferred node for the first availability group in parallel with backing up the second availability group based on a preferred node identified for the second availability group.

For example, a backup application identifies availability group 1 and availability group 2 scheduled for backup. The backup application logs into a structured query language instance of availability group 1 on an active node. The backup application identifies a primary replica for availability group 1 by using the sys.dm_hadr_availability_group_states table. The backup application identifies a node as a backup preference for availability group 1 based on the primary replica for availability group 1 by using the sys.availability_groups table. The backup application identifies the backup preference for availability group 1 as a preferred node for backing up availability group 1 if the backup preference for availability group 1 is on-line. The backup application configures backup storage based on the name of the cluster of nodes associated with the availability groups 1 and 2. The backup application backs up availability group 1 based on the preferred node for availability group 1 in parallel with backing up availability group 2 based on the preferred node identified for the availability group 2. The backup application reduces the multiple communications, the complexity, and the otherwise significant amount of time required by directly using availability group properties to take an availability group name as an input and identify the preferred node in the cluster for backing up that availability group. The backup application takes backups of all of the availability groups in a cluster through parallel backup processes, even if the preferred node for backing up each availability group is different or the same, which makes the backup processes less disruptive and resource intensive.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for identifying preferred nodes for backing up availability groups.

In the prior art, if a system needs to use a procedure which takes a database replica name as an input and returns whether a current node is the preferred node to be used for backing up the database replica, the system must enumerate the databases participating in the multiple availability groups, and run the procedure on all of the nodes which are part of the cluster, which would require a significant amount of time. Even after the preferred node is identified for backing up a database replica in an availability group, backing up every database replica in every availability group in a cluster of nodes requires the same process to be executed sequentially on an individual basis for each database in each availability group. Embodiments herein provide federated back up of availability groups. A backup application reduces the multiple communications, the complexity, and the otherwise significant amount of time required by directly using availability group properties to take an availability group name as an input and identify the preferred node in the cluster for backing up that availability group. The backup application takes backups of all of the availability groups in a cluster through parallel backup processes, even if the preferred node for backing up each availability group is different or the same, which makes the backup processes less disruptive and resource intensive.

Figure 2:
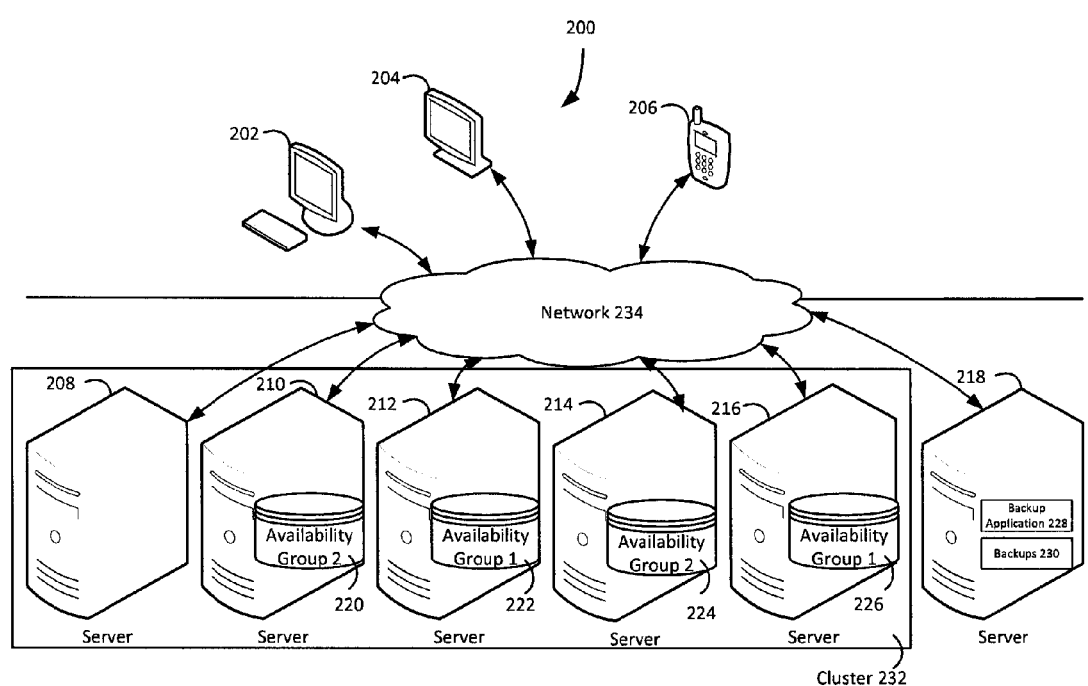
FIG. 2 illustrates a block diagram of an example system for federated back up of availability groups, under an embodiment.

FIG. 2 illustrates a block diagram of a system that implements federated back up of availability groups, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second server 210, a third server 212, a fourth server 214, a fifth server 216, and a sixth server 218 that may be provided by a hosting company. The second server 210 includes a primary availability group 2 220, the third server 212 includes a primary availability group 1 222, the fourth server 214 includes a secondary availability group 2 224, the fifth server 216 includes a secondary availability group 1 226, and the sixth server 218 includes a backup application 228 and backups 230. Although FIG. 2 depicts the backups 230 residing on the sixth server 218, the backups 230 may be stored elsewhere, such as on another server or on a storage array, which are not depicted in FIG. 2. The servers 208-216 comprise a cluster 232, which does not include the sixth server 218. Therefore, the servers 208-216 may be referred to as the nodes 208-216 in the cluster 232. The clients 202-206 and the servers 208-218 communicate via a network 234. Although FIG. 2 depicts the system 200 with three clients 202-206, six servers 208-218, four availability group instances 220-226, one backup application 228, one set of backups 230, one cluster 232, and one network 234, the system 200 may include any number of clients 202-206, any number of servers 208-218, any number of availability group instances 220-226, any number of backup applications 228, any number of sets of backups 230, any number of clusters 232, and any number of networks 234. The clients 202-206 and the servers 208-218 may each be substantially similar to the system 100 depicted in FIG. 1. FIG. 2 depicts the backup application 228 residing completely on the sixth server 218, but the backup application 228 may reside completely on any of the servers 208-216, completely on any of the clients 202-206, completely on another server that is not depicted in FIG. 2, or in any combination of partially on the servers 208-218, partially on the clients 202-206, and partially on the other server.

The backup application 228 may be, for example, EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup application, one of skill in the art would recognize that other backup applications and their corresponding functionalities may be used. The backup application 228 may also be implemented as a NetWorker® Module For Microsoft Applications, which, as stated above, may reside completely on any of the servers 208-216, completely on any of the clients 202-206, completely on another server that is not depicted in FIG. 2, or in any combination of partially on the servers 208-218, partially on the clients 202-206, and partially on the other server.

The backup application 228 identifies multiple availability groups that are scheduled to back up a database replica. For example, the backup application 228 identifies availability group 1 and availability group 2 scheduled for backup of their database replicas, discovers that the server 214 is the active node for the cluster 232, and makes the node 214 the coordinating node for the federated backup. The backup application 228 may start the backup using nsrjobd to send a job request to nsrexecd on the cluster server alias, the node 214, which forwards the job request to nsrsqlsv for further processing.

When the backup application 228 is scheduled to back up a replica of a database for an availability group, the backup application must first determine if the active node for a cluster includes the availability group. For example, if the backup application 228 is scheduled to back up a replica for the availability group 2, the backup application 228 determines if the active node 214 for the cluster 232 includes the availability group 2 by identifying any structured query language instances on the active node 214. If the active node does not include the availability group, the backup application 228 identifies an owner node for the availability group and triggers a process on the owner node, which converts the owner node into the active node. For example, if the third server 212 is the active node and the third server 212 does not include any instances of the availability group 2, the backup application 228 runs a powershell query (Get-Cluster-Group) to identify the second server 210 as the owner of the availability group 2, and triggers a process on the second server 210, which converts the second server 210 to the active node 210 for the cluster 232.

If the current node is the active node, the backup application 228 logs into a structured query language instance on the active node. For example, the backup application 228 logs into the primary availability group 2 220 on the second server 210, which is the active node 210 for the cluster 232. Then the backup application 228 identifies a primary replica for an availability group identified for backup. For example, the backup application 228 identifies the primary availability group 2 220 as including the primary replica for the availability group 2 by using a sys.dm_hadr_availability_group_states table. Next, the backup application 228 identifies a backup preference for an availability group based on a primary replica. For example, the backup application 228 identifies the fourth server 214, which include the secondary availability group 2 224, as the backup preference for the availability group 2 based on the primary replica by using the sys.availability_groups table.

The backup preference for an availability group may identify the primary replica only, identify secondary replicas only, identify a secondary replicas preference, or identify an any replicas preference. If the backup preference identifies the primary replica only, the backup application 228 identifies the server which includes the primary availability group as the preferred node for backing up the availability group, as the primary replica is always on-line, processing the most current data for its databases.

If the backup preference identifies the secondary replica only, the backup application 228 ignores the primary replica and identifies all of the secondary replicas in their order of priority by using the sys.availability_replicas table, and the backup application 228 identifies the server which includes the on-line replica with the highest priority as the preferred node for backing up the availability group.

If the backup preference identifies a secondary replica preference, the backup application 228 ignores the primary replica and identifies all of the secondary replicas in their order of priority by using the sys.availability_replicas table, and the backup application 228 identifies the server which includes the on-line secondary replica with the highest priority as the preferred node for backing up the availability group. If none of the secondary replicas is on-line, the backup application 228 identifies the server which includes the primary availability group as the preferred node for backing up the availability group.

If the backup preference identifies an any replicas preference, the backup application 228 identifies all of the replicas in their order of priority by using the sys.availability_replicas table, and the backup application 228 identifies the server which includes the on-line replica with the highest priority as the preferred node for backing up the availability group.

Having identified a backup preference, the backup application 228 determines whether the backup preference is on-line, and is therefore processing the most recent data for any database replicas that are part of its availability group for the backup preference node. For example, the backup application 228 attempts to log in to the fourth server 214, which includes the secondary availability group 2 224. If the node identified as the backup preference is on-line, the backup application 228 identifies the backup preference as the preferred node for backing up the availability group. For example, the backup application 228 identifies the fourth server 214, which includes the secondary availability group 2 224, as the preferred node for backing up the availability group 2 based on the secondary availability group 2 224 on the fourth server 214 being on-line.

Next, the backup application 228 configures backup storage based on a name of a cluster of nodes associated with the multiple availability groups scheduled for backup. For example, the backup application 228 configures the storage for the backups 230 based on the name of cluster 232, which includes availability group 1 and availability group 2.

Then the backup application 228 backs up a first availability group based on the preferred node for the first availability group in parallel with backing up a second availability group based on the preferred node identified for the second availability group. For example, the backup application 228 backs up availability group 1 based on the preferred node 216 for availability group 1 in parallel with backing up availability group 2 based on the preferred node 214 identified for availability group 2, which speeds up the backup process, which stores the backups 230. These federated backups can be performed in parallel at the level of availability groups and/or at the level of database replicas within the availability groups.

The following procedure describes how the backup application 228 may back up multiple availability groups in parallel. The nsrsqlsv makes itself a creator job, and sends the backup request with the appropriate commands for availability group 1 based on the preferred node 216 and availability group 2 based on the preferred node 214 in parallel through nsrjobd. This new job request is send to nsrexecd on the node 216, and nsrexecd forwards the job request to nsrsqlsv to back up the databases of availability group 1 on the node 216. In parallel with the first new job request, another new job request is send to nsrexecd on the node 214, and nsrexecd forwards the job request to nsrsqlsv to back up the databases of availability group 2 on the node 214. From the command, nsrsqlsv on the node 216 understands that it will now act in a slave process capacity, meaning that nsrsqlsv will not process this command further for cluster aware processing. Instead, nsrsqlsv returns the backup completion message to the coordinating node. Similarly, backup is completed in slave node 214 and its backup completions message is also returned to the coordinating node. Upon receiving the backup completion messages from the slave nodes 214 and 216, the nsrsqlsv on the coordinating node sets a completion message for the save group which includes that availability groups 1 and 2.

Figure 3:
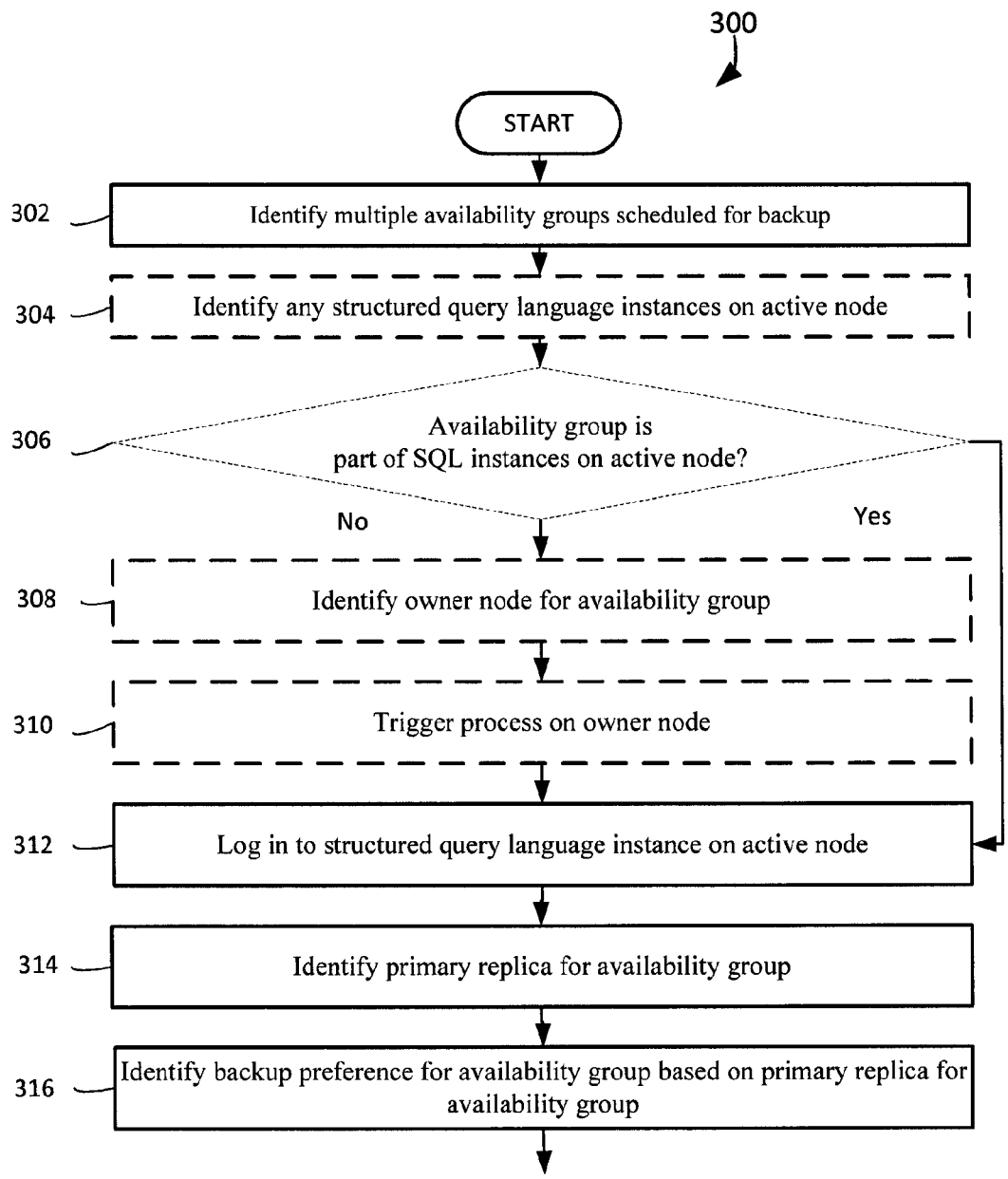
FIG. 3 is a flowchart that illustrates a method for federated back up of availability groups, under an embodiment.
Figure 3:
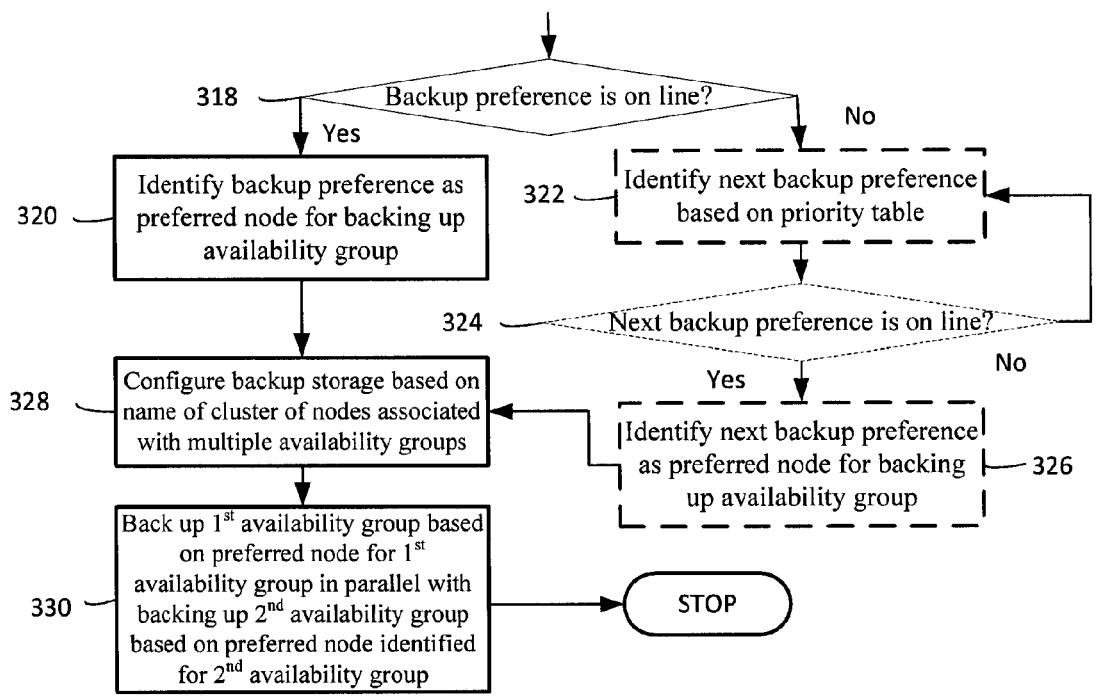

FIG. 3 is a flowchart that illustrates a method for federated back up of availability groups, under an embodiment. Flowchart 300 illustrates method acts illustrated as flowchart blocks for certain steps involved in and/or between the clients 202-206 and/or the servers 208-218 of FIG. 2.

The backup application 228 begins by identifying multiple availability groups that are scheduled to back up database replicas, block 302. For example, the backup application 228 identifies availability group 1 and availability group 2 scheduled for backup of their database replicas, discovers that the server 214 is the active node for the cluster 232, and makes the node 214 the coordinating node for the federated backups. Having identified multiple availability groups that are scheduled to back up database replicas, the backup application 228 may also identify any structured query language instances on the active node, block 304. For example, the backup application 228 identifies the availability group 2 224 on the active node 214.

Having identifies any SQL instances on the active node, the backup application 228 may determine whether an availability group identified for backup is part of the SQL instances on the active node, block 306. For example, the backup application 228 determines if the active node 214 for the cluster 232 includes the availability group 2. If the availability group identified for backup is not part of the SQL instances on the active node, the flowchart 300 continues to block 308. If the availability group identified for backup is part of the SQL instances on the active node, the flowchart 300 proceeds to block 312.

If the availability group identified for backup is not part of the SQL instances on the active node, the backup application 228 may identify the owner node for the availability group, block 308. For example, the backup application 228 runs a powershell query (Get-Cluster-Group) to identify the second server 210 as the owner of the availability group 2. Having identified the owner node for the availability group, the backup application 228 may trigger a process on the owner node, block 310. For example, the backup application 228 triggers a process on the second server 210, which converts the second server 210 to the active node 210 for the cluster 232.

Having identified the active node and the availability group, the backup application 228 logs into a SQL instance on the active node, block 312. For example, the backup application 228 logs into the primary availability group 2 220 on the second server 210, which is the active node 210 for the cluster 232. Having logged into a SQL instance on the active node, the backup application 228 identifies the primary replica for the availability group, block 314. For example, the backup application 228 identifies the primary availability group 2 220 as including the primary replica for the availability group 2 by using a sys.dm_hadr_availability_group_states table.

Having identified the primary replica for the availability group, the backup application 228 also identifies the backup preference for the availability group based on the primary replica for the availability group, block 316. For example, the backup application 228 identifies the fourth server 214, which include the secondary availability group 2 224, as the backup preference for the availability group 2 based on the primary replica for the availability group 2 by using the sys.availability_groups table. After identifying the backup preference, the backup application 228 checks whether the backup preference is on-line, block 318. For example, the backup application 228 attempts to log in to the fourth server 214, which includes the secondary availability group 2 224. If the backup preference is on-line, the flowchart 300 continues to block 320. If the backup preference is not on-line, the flowchart 300 proceeds to block 322.

If the backup preference is on-line, the backup application 228 identifies the backup preference as the preferred node for backing up the availability group, block 320. For example, the backup application 228 identifies the fourth server 214, which includes the secondary availability group 2 224, as the preferred node for backing up the availability group 2 based on the secondary availability group 2 224 on the fourth server 214 being on-line. Then the flowchart 300 proceeds to block 328. If the backup preference is not on-line, the backup application 228 may identify the next backup preference based on the priority table, block 322. For example, if the backup preference is not on-line, the backup application 228 identifies all of the replicas in their order of priority by using the sys.availability_replicas table, Having identified the next backup preference based on the priority table, the backup application 228 may check whether the next backup preference is on-line, block 324. For example, the backup application 228 logs into the primary availability group 2 220 on the second server 210, which is the active node 210 for the cluster 232. If the next backup preference is on-line, the flowchart 300 continues to block 326. If the next backup preference is not on-line, the flowchart 300 returns to block 322 to identify the next in priority backup preference based on the priority table. If the next backup preference is on-line, the backup application 228 may identify the next backup preference as the preferred node for backing up the availability group, block 326. For example, the backup application 228 identifies the second server 210, which includes the primary availability group 2 220, as the preferred node for backing up the availability group 2 based on the secondary availability group 2 224 on the fourth server 214 not being on-line.

Having identified the preferred node for backing up the availability group, the backup application 228 configures backup storage based on the name of the cluster of nodes associated with multiple availability groups scheduled for backup, block 328. For example, the backup application 228 configures the storage for the backups 230 based on the name of cluster 232, which includes availability group 1 and availability group 2. Having configured backup storage based on the name of the cluster of nodes associated with multiple availability groups scheduled for backup, the backup application 228 backs up the first availability group based on the preferred node for the first availability group in parallel with backing up the second availability group based on the preferred node identified for the second availability group, block 330. For example, the backup application 228 backs up availability group 1 based on the preferred node 216 for availability group 1 in parallel with backing up availability group 2 based on the preferred node 214 identified for availability group 2, which speeds up the backup process.

Although FIG. 3 depicts the blocks 302-330 occurring in a specific order, the blocks 302-330 may occur in another order. In other implementations, each of the blocks 302-330 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for federated back up of availability groups, the system comprising:
    a processor-based application, which when executed on a computer, will cause the processor to:
        identify a first availability group scheduled for backup and a second availability group scheduled for backup;
        log in to a structured query language instance on an active node;
        identify a primary replica for the first availability group;
        identify a backup preference for the first availability group based on the primary replica for the first availability group;
        determine if the backup preference for the first availability group is on-line;
        identify the backup preference for the first availability group as a preferred node for backing up the first availability group in response to a determination that the backup preference for the first availability group is on-line;
        configure backup storage based on a name of a cluster of nodes associated with the first availability group and the second availability group; and
        back up the first availability group based on the preferred node for the first availability group in parallel with backing up the second availability group based on a preferred node identified for the second availability group.

2. The system of claim 1, wherein the first availability group comprises at least one database and the second availability group comprises at least another database.

3. The system of claim 1, wherein identifying the backup preference for the first availability group comprises one of identifying the primary replica only, identifying secondary replicas only, identifying a secondary replicas preference, and identifying an any replicas preference.

4. The system of claim 1, wherein the processor-based application, when executed, will further cause the processor to:
    identify any structured query language instances on the active node; and
    determine whether the first availability group is part of the structured query language instances on the active node, wherein logging in to the structured query language instance on the active node is in response to a determination that the first availability group is part of the structured query language instances on the active node.

5. The system of claim 4, wherein the processor-based application, when executed, will further cause the processor to:
    identify an owner node for the first availability group in response to a determination that the first availability group is not part of the structured query language instances on the active node, and
    trigger a process on the owner node.

6. The system of claim 1, wherein the processor-based application, when executed, will further cause the processor to:
    identify a next backup preference for the first availability group based on a priority table in response to a determination that the backup preference for the first availability group is not on-line;
    determine if the next backup preference for the first availability group is on-line; and
    identify the next backup preference for the first availability group as the preferred node for backing up the first availability group in response to a determination that the next backup preference for the first availability group is on-line.

7. The system of claim 1, wherein the preferred node is identified for the second availability group based on:
    identifying a primary replica for the second availability group;
    identifying a backup preference for the second availability group based on the primary replica for the second availability group;
    determining if the backup preference for the second availability group is on-line; and
    identifying the backup preference for the second availability group as the preferred node for backing up the second availability group in response to a determination that the backup preference for the second availability group is on-line.

8. A computer-implemented method for federated back up of availability groups, the method comprising:
    identifying a first availability group scheduled for backup and a second availability group scheduled for backup;
    logging in to a structured query language instance on an active node;
    identifying a primary replica for the first availability group;
    identifying a backup preference for the first availability group based on the primary replica for the first availability group;
    determining if the backup preference for the first availability group is on-line;
    identifying the backup preference for the first availability group as a preferred node for backing up the first availability group in response to a determination that the backup preference for the first availability group is on-line;
    configuring backup storage based on a name of a cluster of nodes associated with the first availability group and the second availability group; and
    backing up the first availability group based on the preferred node for the first availability group in parallel with backing up the second availability group based on a preferred node identified for the second availability group.

9. The method of claim 8, wherein the first availability group comprises at least one database and the second availability group comprises at least another database.

10. The method of claim 8, wherein identifying the backup preference for the first availability group comprises one of identifying the primary replica only, identifying secondary replicas only, identifying a secondary replicas preference, and identifying an any replicas preference.

11. The method of claim 8, wherein the method further comprises:
identifying any structured query language instances on the active node;
determining whether the first availability group is part of the structured query language instances on the active node, wherein logging in to the structured query language instance on the active node is in response to a determination that the first availability group is part of the structured query language instances on the active node;
identifying an owner node for the first availability group in response to a determination that the first availability group is not part of the structured query language instances on the active node, and
triggering a process on the owner node.

12. The method of claim 8, wherein the method further comprises:
identifying a next backup preference for the first availability group based on a priority table in response to a determination that the backup preference for the first availability group is not on-line;
determining if the next backup preference for the first availability group is on-line; and
identifying the next backup preference for the first availability group as the preferred node for backing up the first availability group in response to a determination that the next backup preference for the first availability group is on-line.

13. The method of claim 8, wherein the preferred node is identified for the second availability group based on:
identifying a primary replica for the second availability group;
identifying a backup preference for the second availability group based on the primary replica for the second availability group;
determining if the backup preference for the second availability group is on-line; and
identifying the backup preference for the second availability group as the preferred node for backing up the second availability group in response to a determination that the backup preference for the second availability group is on-line.

14. A computer program product, comprising a non-transitory computer-readable medium having a computer-readable program code embodied therein to be executed by one or more processors, the program code including instructions to:
identify a first availability group scheduled for backup and a second availability group scheduled for backup;
log in to a structured query language instance on an active node;
identify a primary replica for the first availability group;
identify a backup preference for the first availability group based on the primary replica for the first availability group;
determine if the backup preference for the first availability group is on-line;
identify the backup preference for the first availability group as a preferred node for backing up the first availability group in response to a determination that the backup preference for the first availability group is on-line;
configure backup storage based on a name of a cluster of nodes associated with the first availability group and the second availability group; and
back up the first availability group based on the preferred node for the first availability group in parallel with backing up the second availability group based on a preferred node identified for the second availability group.

15. The computer program product of claim 14, wherein the first availability group comprises at least one database and the second availability group comprises at least another database.

16. The computer program product of claim 14, wherein identifying the backup preference for the first availability group comprises one of identifying the primary replica only, identifying secondary replicas only, identifying a secondary replicas preference, and identifying an any replicas preference.

17. The computer program product of claim 14, wherein the program code includes further instructions to:
identify any structured query language instances on the active node; and
determine whether the first availability group is part of the structured query language instances on the active node, wherein logging in to the structured query language instance on the active node is in response to a determination that the first availability group is part of the structured query language instances on the active node.

18. The computer program product of claim 14, wherein the program code includes further instructions to:
identify an owner node for the first availability group in response to a determination that the first availability group is not part of the structured query language instances on the active node, and
trigger a process on the owner node.

19. The computer program product of claim 14, wherein the program code includes further instructions to
identify a next backup preference for the first availability group based on a priority table in response to a determination that the backup preference for the first availability group is not on-line;
determine if the next backup preference for the first availability group is on-line; and
identify the next backup preference for the first availability group as the preferred node for backing up the first availability group in response to a determination that the next backup preference for the first availability group is on-line.

20. The computer program product of claim 14, wherein the preferred node is identified for the second availability group based on:
identifying a primary replica for the second availability group;
identifying a backup preference for the second availability group based on the primary replica for the second availability group;
determining if the backup preference for the second availability group is on-line; and
identifying the backup preference for the second availability group as the preferred node for backing up the second availability group in response to a determination that the backup preference for the second availability group is on-line.

* * * * *